United States Patent [19]

Iwata

[11] Patent Number: 5,621,676
[45] Date of Patent: Apr. 15, 1997

[54] DISCRETE COSINE TRANSFORMATION SYSTEM AND INVERSE DISCRETE COSINE TRANSFORMATION SYSTEM, HAVING SIMPLE STRUCTURE AND OPERABLE AT HIGH SPEED

[75] Inventor: Eiji Iwata, Chiba, Japan

[73] Assignee: Sony Corporation, Japan

[21] Appl. No.: 552,497

[22] Filed: Nov. 9, 1995

Related U.S. Application Data

[63] Continuation of Ser. No. 115,756, Sep. 3, 1993.

[30] Foreign Application Priority Data

Sep. 17, 1992 [JP] Japan .................................. 4-273738

[51] Int. Cl.$^6$ ........................................................ G06F 7/38
[52] U.S. Cl. ............................................................. 364/725
[58] Field of Search ..................................... 364/725–727

[56] References Cited

U.S. PATENT DOCUMENTS

| | | | |
|---|---|---|---|
| 4,621,337 | 11/1986 | Cates et al. | 364/727 |
| 4,839,844 | 6/1989 | Watari | 364/727 |
| 5,126,962 | 6/1992 | Chiang | 364/725 |
| 5,181,183 | 1/1993 | Miyazaki | 364/725 |
| 5,253,192 | 10/1993 | Tufts | 364/726 |
| 5,349,549 | 9/1994 | Tsutsui | 364/725 |

*Primary Examiner*—Tan V. Mai
*Attorney, Agent, or Firm*—Ronald P. Kananen

[57] ABSTRACT

An 8×8 discrete cosine transformation (8×8 DCT) system with minimum multiplications, without a reduced accuracy of calculation, and operable at a high speed, and an 8×8 inverse discrete cosine transformation (IDCT) system are disclosed. The transformation matrices for an 8×8 DCT are factorized into a constant matrix [Q] and a matrix [R], and the relationship between the original input data [X] and the output matrix data [C] can be defined by [C]=½ [R] [Q] [X]. The matrix [Q] consists of 0, 1, and −1, while the matrix [R] consists of irrational numbers defined by the 8×8 DCT. The computation of the constant matrix [Q] to the matrix data [X] can be realized by an addition and subtraction operation, while multiplication is performed just for the computation of the matrix [R]. The addition and subtraction circuit performs a computation between [X] and [Q], while the multiplication and addition circuit performs a computation between the result of computation of the addition and subtraction circuit and the matrix [R]. Also, an 8×8 IDCT performs the computation inverse to the 8×8 DCT.

10 Claims, 9 Drawing Sheets

FIG. 4

| CLOCK CYCLE | a | b | a+b | a−b |
|---|---|---|---|---|
| 0 | $X_0$ | $X_7$ | $X_0+X_7$ | $X_0-X_7$ $(=S_7)$ |
| 1 | $X_1$ | $X_6$ | $X_1+X_6$ | $X_1-X_6$ $(=S_6)$ |
| 2 | $X_2$ | $X_5$ | $X_2+X_5$ | $X_2-X_5$ $(=S_5)$ |
| 3 | $X_3$ | $X_4$ | $X_3+X_4$ | $X_3-X_4$ $(=S_4)$ |
| 4 | $X_0+X_7$ | $X_3+X_4$ | $X_0+X_3+X_4+X_7$ | $X_0-X_3-X_4+X_7$ $(=S_3)$ |
| 5 | $X_1+X_6$ | $X_2+X_5$ | $X_1+X_2+X_5+X_6$ | $X_1-X_2-X_5+X_6$ $(=S_2)$ |
| 6 | $X_0+X_3+X_4+X_7$ | $X_1+X_2+X_5+X_6$ | $X_0+X_1+X_2+X_3+X_4+X_5+X_6+X_7$ $(=S_0)$ | $X_0-X_1-X_2+X_3+X_4-X_5-X_6+X_7$ $(=S_1)$ |

FIG. 6

| CLOCK CYCLE | INPUT OF 1ST M&A | OUTPUT OF 1ST M&A | INPUT OF 2ND,3RD M&A | OUTPUT OF 2ND M&A | OUTPUT OF 3RD M&A |
|---|---|---|---|---|---|
| 0 | $S_0$ | $A \cdot S_0$ ($=C_0$) | $S_4$ | $G \cdot S_4$ | $E \cdot S_4$ |
| 1 | $S_1$ | $A \cdot S_1$ ($=C_4$) | $S_5$ | $G \cdot S_4 + F \cdot S_5$ | $E \cdot S_4 + G \cdot S_5$ |
| 2 | $S_2$ | $C \cdot S_2$ | $S_6$ | $G \cdot S_4 + F \cdot S_5 + E \cdot S_6$ | $E \cdot S_4 + G \cdot S_5 - D \cdot S_6$ |
| 3 | $S_3$ | $C \cdot S_2 + B \cdot S_3$ ($=C_2$) | $S_7$ | $G \cdot S_4 + F \cdot S_5 + E \cdot S_6 + D \cdot S_7$ ($=C_1$) | $E \cdot S_4 + G \cdot S_5 - D \cdot S_6 + F \cdot S_7$ ($=C_5$) |
| 4 | $S_2$ | $-B \cdot S_2$ | $S_4$ | $-F \cdot S_4$ | $-D \cdot S_4$ |
| 5 | $S_3$ | $-B \cdot S_2 + C \cdot S_3$ ($=C_6$) | $S_5$ | $-F \cdot S_4 - D \cdot S_5$ | $-D \cdot S_4 + E \cdot S_5$ |
| 6 | | | $S_6$ | $-F \cdot S_4 - D \cdot S_5 - G \cdot S_6$ | $-D \cdot S_4 + E \cdot S_5 - F \cdot S_6$ |
| 7 | | | $S_7$ | $-F \cdot S_4 - D \cdot S_5 - G \cdot S_6 + E \cdot S_7$ ($=C_3$) | $-D \cdot S_4 + E \cdot S_5 - F \cdot S_6 + G \cdot S_7$ ($=C_7$) |

FIG. 8

| CLOCK CYCLE | INPUT OF 1ST M&A | OUTPUT OF 1ST M&A | INPUT OF 2ND,3RD M&A | OUTPUT OF 2ND M&A | OUTPUT OF 3RD M&A |
|---|---|---|---|---|---|
| 0 | $C_0$ | $A \cdot C_0$ $(=t_0)$ | $C_1$ | $G \cdot C_1$ | $E \cdot C_1$ |
| 1 | $C_4$ | $A \cdot C_4$ $(=t_1)$ | $C_3$ | $G \cdot C_1 - F \cdot C_3$ | $E \cdot C_1 - G \cdot C_3$ |
| 2 | $C_2$ | $C \cdot C_2$ | $C_5$ | $G \cdot C_1 - F \cdot C_3 + E \cdot C_5$ | $E \cdot C_1 - G \cdot C_3 - D \cdot C_5$ |
| 3 | $C_6$ | $C \cdot C_2 - B \cdot C_6$ $(=t_2)$ | $C_7$ | $G \cdot C_1 - F \cdot C_3 + E \cdot C_5 - D \cdot C_7$ $(=t_4)$ | $E \cdot C_1 - G \cdot C_3 - D \cdot C_5 - F \cdot C_7$ $(=t_6)$ |
| 4 | $C_2$ | $B \cdot C_2$ | $C_1$ | $F \cdot C_1$ | $D \cdot C_1$ |
| 5 | $C_6$ | $B \cdot C_2 + C \cdot C_6$ $(=t_3)$ | $C_3$ | $F \cdot C_1 - D \cdot C_3$ | $D \cdot C_1 + E \cdot C_3$ |
| 6 | | | $C_5$ | $F \cdot C_1 - D \cdot C_3 + G \cdot C_5$ | $D \cdot C_1 + E \cdot C_3 + F \cdot C_5$ |
| 7 | | | $C_7$ | $F \cdot C_1 - D \cdot C_3 + G \cdot C_5 + E \cdot C_7$ $(=t_5)$ | $D \cdot C_1 + E \cdot C_3 + F \cdot C_5 - G \cdot C_7$ $(=t_7)$ |

FIG. 10

| CLOCK CYCLE | INPUT a | INPUT b | a+b | a−b |
|---|---|---|---|---|
| 0 | $t_0$ | $t_1$ | $t_0+t_1$ | $t_0-t_1$ |
| 1 | $t_0+t_1$ | $t_3$ | $t_0+t_1+t_3$ | $t_0+t_1-t_3$ |
| 2 | $t_0-t_1$ | $t_2$ | $t_0-t_1+t_2$ | $t_0-t_1-t_2$ |
| 3 | $t_0+t_1+t_3$ | $t_7$ | $t_0+t_1+t_3+t_7\,(=X_0)$ | $t_0+t_1+t_3-t_7\,(=X_7)$ |
| 4 | $t_0-t_1+t_2$ | $t_6$ | $t_0-t_1+t_2+t_6\,(=X_1)$ | $t_0-t_1+t_2-t_6\,(=X_6)$ |
| 5 | $t_0+t_1-t_3$ | $t_4$ | $t_0+t_1-t_3+t_4\,(=X_3)$ | $t_0+t_1-t_3-t_4\,(=X_4)$ |
| 6 | $t_0-t_1-t_2$ | $t_5$ | $t_0-t_1-t_2+t_5\,(=X_2)$ | $t_0-t_1-t_2-t_5\,(=X_5)$ |

DISCRETE COSINE TRANSFORMATION SYSTEM AND INVERSE DISCRETE COSINE TRANSFORMATION SYSTEM, HAVING SIMPLE STRUCTURE AND OPERABLE AT HIGH SPEED

This application is a continuation of application Ser. No. 08/115,756 filed Sep. 3, 1993.

BACKGROUND OF THE INVENTION

1. Field of the Invention

The present invention relates to a discrete cosine transformation (DCT) system and an inverse discrete cosine transformation (IDCT) system used for digital image processing etc.

2. Description of the Related Art

A discrete cosine transformation (DCT) is a type of an of orthogonal transformation which performs a transformation of data in a real domain to data in a frequency domain. An inverse discrete cosine transformation (IDCT) is also a type of an orthogonal transformation which performs a transformation inverse to the DCT, that is, performs a transformation of data in a frequency domain to data in a real domain. The DCT and the IDCT, for example, are used for image signal processing etc. An 8 row×8 column DCT and an 8 row×8 column IDCT may be expressed by the following basic (standard) equations 1 and 2:

$$DCT: [C] = \tfrac{1}{2} [P_0][X] \quad (1)$$

$$IDCT: [X] = \tfrac{1}{2} [P_0^t][C] \quad (2)$$

Here, [X] donates an 8 row×8 column original matrix data in a real domain. [C] denotes an 8 row×8 column matrix data in a frequency domain. $[P_0]$ donates an 8 row×8 column matrix, and $[P_0^t]$ denotes a transposition matrix of the matrix [P]. Hereinafter, the suffices t on the left top of matrices indicate a transposition matrix.

The matrix $[P_0]$ is defined by the following equation 3.

$$[P_0] = \begin{pmatrix} A & A & A & A & A & A & A & A \\ D & E & F & G & -G & -F & -E & -D \\ B & C & -C & -B & -B & -C & C & B \\ E & -G & -D & -F & F & D & G & -E \\ A & -A & -A & A & A & -A & -A & A \\ F & -D & G & E & -E & -G & D & -F \\ C & -B & B & -C & -C & B & -B & C \\ G & -F & E & -D & D & -E & F & -C \end{pmatrix} \quad (3)$$

The coefficients (factors) A, B, C, D, E, F, and G in the matrix [P] are shown in Table 1.

TABLE 1

| |
|---|
| A = cos (π/4) |
| B = cos (π/8) |
| C = cos (3π/8) |
| D = cos (π/16) |
| E = cos (3π/16) |
| F = cos (5π/16) |
| G = cos (7π/16) |

When obtaining the components of the matrix [C] in a frequency domain by eight multiplications each, the computation processing of the 8×8 DCT expressed by the above-mentioned equation 1 requires 8×64=512 multiplications to obtain all the 64 components of the matrix [C].

Further, in the computation processing of the 8×8 IDCT as well, when obtaining the components of the original data [X] in a real domain by eight multiplications each, 8×64= 512 multiplications are required to obtain all the 64 components of the data [X].

Proposals have been made of circuits which can reduce the number of multiplications in the computation processing of the 8×8 DCT and 8×8 IDCT, and perform the calculations of the 8×8 DCT and 8×8 IDCT at a high speed.

For example, in an 8×8 DCT circuit and 8×8 IDCT circuit shown on pages 492 to 498 of the IEEE JOURNAL OF SOLID-STATE CIRCUITS, VOL. 27, NO. 4, APRIL 1992, the preprocessing (addition and subtraction) is performed on the eight inputs, then eight fourth-order inner product computation units are used to obtain the eight outputs. This operation is repeated eight times to obtain the 64 outputs.

For example, a look at one element $c_0$ of the matrix [C] in equation 1 shows that the equation for obtaining $c_0$ becomes as shown in the following equation 4. Here, $x_0$ to $x_7$ are elements of the matrix [X].

$$c_0 = A(x_0+x_7) + A(x_1+x_6) + A(x_2+x_5) + A(x_3+x_4) \quad (4)$$

In equation 4, four multiplications are necessary to obtain $c_0$, i.e., multiplications of A and $(x_0+x_7)$, A and $(x_1+x_6)$, A and $(x_2+x_5)$, and A and $(x_3+x_4)$. Therefore, the number of multiplications required for obtaining all the 64 elements of the matrix [C] becomes 4×64=256.

When performing the IDCT in accordance with equation 2, 256 multiplications are needed to obtain all the 64 elements of the matrix [X].

In the above-mentioned conventional 8×8 DCT and the 8×8 IDCT mentioned above, however, while the number of multiplications is reduced, 256 multiplications still must be performed. This suffers from the disadvantage of a long operation time.

Also, if such a large number of multiplications are performed by circuits, the number of multiplication circuits, which have more complicated circuit structures than addition circuits or subtraction circuits, becomes larger and therefore, it also suffers from the disadvantage that the circuit structures of the 8×8 DCT circuit and 8×8 IDCT circuit become extremely complicated.

Further, if a large number of computations involving irrational numbers are performed, the error caused due to the approximation of irrational numbers accumulates and therefore, it further suffers from the disadvantage that the accuracy of the result of the calculation is degraded.

SUMMARY OF THE INVENTION

An object of the present invention is to provide a new 8 row×8 column discrete cosine transformation (8×8 DCT) method which can perform an 8×8 DCT at a high Speed without reduction in accuracy.

Another object of the present invention is to provide an 8×8 DCT system having a simple circuit structure by minimizing the number of multiplications without reduction in accuracy, and operable at a high speed.

Still another object of the present invention is to provide a new 8 row×8 column inverse discrete cosine transformation (8×8 IDCT) method which can perform an 8 ×8 IDCT at a high speed without reduction in accuracy.

Yet another object of the present invention is to provide an 8×8 IDCT system having a simple circuit structure by minimizing the number of multiplications without reduction in accuracy, and operable at a high speed.

Still another object of the present invention is to provide new discrete cosine transformation methods other than the 8×8 DCT method, and new inverse discrete cosine transformation methods other than the 8×8 IDCT method, which cam perform DCTs and inverse DCTs at a high speed without reduction in accuracy.

Another object of the present invention is to provide new DCT systems employed the new DCT methods, and new IDCT systems employed the new IDCT methods, having a simple circuit structure, operable at a high speed, and without reduction in accuracy.

The principle of the present invention will be described with reference to an 8×8 discrete cosine transformation.

For example, the equation 4 for obtaining the component data $c_0$ of the equation 1 of the above-mentioned 8×8 DCT can be modified to the following equation 5:

$$c_0 = A(x_0 + x_7 + x_1 + x_6 + x_2 + x_5 + x_3 + x_4) \quad (5)$$

As will be understood from equation 5, the component data $c_0$ can theoretically be found by a single multiplication by multiplying the irrational number A with the result of addition of $(x_0+x_1+x_2+x_3+x_4+x_5+x_6+x_7)$, but with such a method of calculation, it is necessary to use eight multipliers to calculate the component data $c_0$ to $c_7$ and the size of the circuit therefore ends up larger.

Therefore, a method requiring fewer multiplications and a simple circuit structure is considered. The matrix [P] in equation 1 and the matrix [P'] in equation 2 may be factorized into smaller matrices (matrix factorization: dissolution) and equation 1 and equation 2 may be written to the forms shown in the following equation 6 and equation 7.

$$DCT:[C] = \tfrac{1}{2}[R][Q][X] \quad (6)$$

$$IDCT:[X] = \tfrac{1}{2}[Q^t][R^t][C] \quad (7)$$

The matrix [R] in equation 6 is expressed by the following equation 8.

$$[R] = \begin{pmatrix} A & 0 & 0 & 0 & 0 & 0 & 0 & 0 \\ 0 & 0 & 0 & 0 & G & F & E & D \\ 0 & 0 & C & B & 0 & 0 & 0 & 0 \\ 0 & 0 & 0 & 0 & -F & -D & -G & E \\ 0 & A & 0 & 0 & 0 & 0 & 0 & 0 \\ 0 & 0 & 0 & 0 & E & G & -D & F \\ 0 & 0 & -B & C & 0 & 0 & 0 & 0 \\ 0 & 0 & 0 & 0 & -D & E & -F & G \end{pmatrix} \quad (8)$$

As shown in equation 8, the matrix [R] is an 8×8 matrix including the irrational numbers A, B, C, D, E, F, and G, shown in table 1, defined by the cosine function in the 8×8 DCT and the negative irrational numbers −B, −D, −G, and "0" of the same.

The matrix [Q] in equation 6 is expressed by the following equation 9.

$$[Q] = \begin{pmatrix} 1 & 1 & 1 & 1 & 1 & 1 & 1 & 1 \\ 1 & -1 & -1 & 1 & 1 & -1 & -1 & 1 \\ 0 & 1 & -1 & 0 & 0 & -1 & 1 & 0 \\ 1 & 0 & 0 & -1 & -1 & 0 & 0 & 1 \\ 0 & 0 & 0 & 1 & -1 & 0 & 0 & 0 \\ 0 & 0 & 1 & 0 & 0 & -1 & 0 & 0 \\ 0 & 1 & 0 & 0 & 0 & 0 & -1 & 0 \\ 1 & 0 & 0 & 0 & 0 & 0 & 0 & -1 \end{pmatrix} = \begin{pmatrix} Q1 & Q2 \\ Q3 & Q4 \end{pmatrix} \quad (9)$$

As shown in equation 9, the matrix [Q] is a constant matrix having the submatrices [Q1], [Q2], [Q3], and [Q4], each consisting of 4 row×4 column and comprised of 0, 1, and −1.

Namely, [Q1] is a 4×4 constant matrix comprised of $$\begin{pmatrix} 1 & 1 & 1 & 1 \\ 1 & -1 & -1 & 1 \\ 0 & 1 & -1 & 0 \\ 1 & 0 & 0 & -1 \end{pmatrix}$$

[Q2] of $$\begin{pmatrix} 1 & 1 & 1 & 1 \\ 1 & -1 & -1 & 1 \\ 0 & -1 & 1 & 0 \\ -1 & 0 & 0 & 1 \end{pmatrix}$$

[Q3] of $$\begin{pmatrix} 0 & 0 & 0 & 1 \\ 0 & 0 & 1 & 0 \\ 0 & 1 & 0 & 0 \\ 1 & 0 & 0 & 0 \end{pmatrix}$$

[Q4] of $$\begin{pmatrix} -1 & 0 & 0 & 0 \\ 0 & -1 & 0 & 0 \\ 0 & 0 & -1 & 0 \\ 0 & 0 & 0 & -1 \end{pmatrix}$$

The transposition matrix [R$^t$] of the matrix [R], and the transposition matrix [Q$^t$] of the matrix [Q], are expressed by the following equation 10 and equation 11.

$$[R^t] = \begin{pmatrix} A & 0 & 0 & 0 & 0 & 0 & 0 & 0 \\ 0 & 0 & 0 & 0 & A & 0 & 0 & 0 \\ 0 & 0 & C & 0 & 0 & 0 & -B & 0 \\ 0 & 0 & B & 0 & 0 & 0 & C & 0 \\ 0 & G & 0 & -F & 0 & E & 0 & -D \\ 0 & F & 0 & -D & 0 & G & 0 & E \\ 0 & E & 0 & -G & 0 & -D & 0 & -F \\ 0 & D & 0 & E & 0 & F & 0 & G \end{pmatrix} \quad (10)$$

$$[Q^t] = \begin{pmatrix} 1 & 1 & 0 & 1 & 0 & 0 & 0 & 1 \\ 1 & -1 & 1 & 0 & 0 & 0 & 1 & 0 \\ 1 & -1 & -1 & 0 & 0 & 1 & 0 & 0 \\ 1 & 1 & 0 & -1 & 1 & 0 & 0 & 0 \\ 1 & 1 & 0 & -1 & -1 & 0 & 0 & 0 \\ 1 & -1 & -1 & 0 & 0 & -1 & 0 & 0 \\ 1 & -1 & 1 & 0 & 0 & 0 & -1 & 0 \\ 1 & 1 & 0 & 1 & 0 & 0 & 0 & -1 \end{pmatrix} = \begin{pmatrix} Q1^t & Q2^t \\ Q3^t & Q3^t \end{pmatrix} \quad (11)$$

A computation on a matrix comprised of factors of 0, 1, and −1 may be realized by addition for the factors 1, subtraction for the factors −1, and no operation for the factors 0 so processing is possible by an addition and subtraction circuit and no multiplication circuit is required here either. Therefore, in the computation expressed by the above-mentioned equation 6, it is sufficient to perform multiplication for only the matrix [R] including irrational numbers.

In the same way, in equation 7 only the multiplication and addition for the transposition matrix [R$^t$] is required.

The 8×8 DCT system of the present invention comprises of an addition and subtraction means for performing addition and subtraction corresponding to the inner product computation of the first constant matrix [Q] and the input data [X] of the matrix form and a multiplication and addition means for performing multiplication and addition corresponding to an inner product computation of the second matrix [R] and the results of the computation at the addition and subtraction circuit.

Also, the 8×8 IDCT system comprises a multiplication and addition means for performing multiplication and addition corresponding to the inner product computation of the first matrix [R′], which is the transposition matrix of the matrix [R], and the input data [C] of the matrix form, and an addition and subtraction means for performing an addition and subtraction corresponding to the inner product computation of the second constant matrix [Q′], which is the transposition matrix of the constant matrix [Q], and the result of the computation at the multiplication and addition circuit.

Further, even for a system which performs a discrete cosine transformation and an inverse discrete cosine transformation other than the above-mentioned 8×8 discrete cosine transformation and 8×8 inverse discrete cosine transformation, for example, in a 4×4 DCT and a 4×4 IDCT, and 4×8 DCT and a 4×8 IDCT, the number of multiplications in a matrix including irrational numbers is reduction in by factorizing the transformation matrices of the discrete cosine transformation and the inverse discrete cosine transformation into constant matrices with factors of +1, −1, and 0, and/or factors 1 and 0, and a matrix including irrational numbers defined by the discrete cosine transformation, and performing computations on these using the addition and subtraction means for the constant matrices, and the multiplication and addition means for the matrix including irrational numbers.

The 8×8 discrete cosine transformation system of the present invention performs the calculation of equation 6 by the following two steps:

Step 1: [S]=[Q] [X]

Step 2: [C]=½[R] [S]

In these operations, multiplication is only required at step 2, so the 8×8 discrete cosine transformation system of the present invention can perform the calculation of step 1 by an addition and subtraction means, and can perform the calculation of step 2 by a multiplication and addition means. Note, a computation of ½ is realized by shifting one bit, and thus, no division or multiplication computation is required.

Also, the 8×8 inverse discrete cosine transformation system of the present invention performs the calculation of equation 7 by the following two steps:

Step 1: [S]=[R′] [X]

Step 2: [C]=½ [Q′] [S]

In these operations, multiplication is only required at step 1, so the 8×8 inverse discrete cosine transformation system of the present invention can perform the calculation of step 1 by a multiplication and addition means, and can perform the calculation of step 2 by an addition and subtraction means.

Further, even for a system performing a discrete cosine transformation other than the above 8×8 discrete cosine transformation, the transformation matrix of the discrete cosine transformation is factorized into at least one constant matrix with factors of +1, −1, and 0, and/or factors of +1 and 0, and, a matrix including irrational numbers defined by the discrete cosine transformation, an addition and subtraction is performed at step 1 corresponding to an inner product computation on the data of the matrix form with the constant matrix with factors of +1, −1, and 0, and/or factors of +1 and 0, and a multiplication and addition is performed at step 2 corresponding to an inner product computation on the result of the addition and subtraction of step 1 with the matrix including irrational numbers defined by the discrete cosine transformation.

Also, even for a system performing an inverse discrete cosine transformation other than the above 8×8 inverse discrete cosine transformation, the transformation matrix of the inverse discrete cosine transformation is factorized into at least one constant matrix with factors of +1, −1, and 0, and/or factors of +1 and 0, and, a matrix including irrational numbers defined by the discrete cosine transformation, a multiplication and addition is performed at step 1 corresponding to an inner product computation on the result of the data of the matrix form with the matrix including irrational numbers defined by the discrete cosine transformation, and an addition and subtraction is performed at step 2 corresponding to an inner product computation on the result of the multiplication and addition of step 1 with the constant matrix with factors of +1, −1, and 0, and/or factors of +1 and 0.

BRIEF DESCRIPTION OF THE DRAWINGS

The above objects and features and other objects and features will be become clearer by the description of embodiments of he present invention explained with reference to the attached drawings, in which:

FIG. 4 is a chart for explaining the timing of the signal processing of the addition and subtraction circuit;

FIG. 6 is a circuit diagram for explaining the timing of the signal processing at the time of calculation of step 2 using the multiplication and addition circuit of an 8×8 DCT system of the present invention;

FIG. 8 is a chart for explaining the timing of the signal processing at the time of calculation of step 1 using the multiplication and addition circuit of an 8×8 DCT system of the present invention;

FIG. 10 is a chart of the concept of signal processing at the time of calculation of step 2 using the addition and subtraction circuit of an 8×8 IDCT system of the present invention.

DESCRIPTION OF THE PREFERRED EMBODIMENTS

As a first embodiment of the present invention, a description will be made of an 8×8 discrete cosine transformation (8×8 DCT) system and an 8×8 inverse discrete cosine transformation (8×8 IDCT) system for performing time-division processing.

Figure 1:
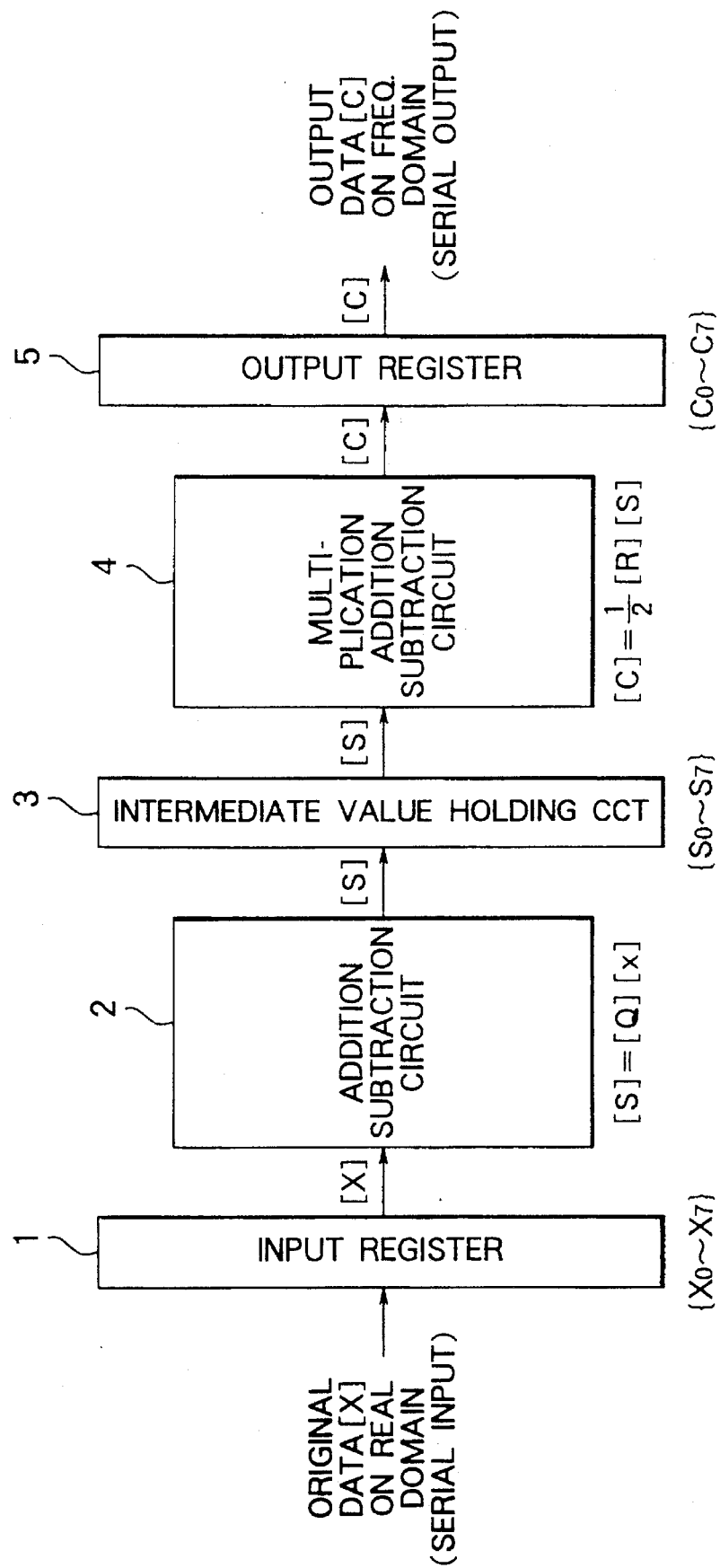
FIG. 1 is a circuit diagram showing the circuit structure of an 8×8 DCT system of the present invention.

FIG. 1 is a view of the structure of an 8×8 DCT system. In FIG. 1, an 8×8 DCT system includes an input register 1, an addition and subtraction circuit 2, an intermediate value holding circuit 3, a multiplication and addition circuit 4, and an output register 5. This 8×8 DCT system comprised of a two-stage pipeline structure having an addition and subtraction circuit 2 as a first stage and a multiplication and addition circuit 4 as a second stage through the intermediate value holding register 3.

The 8×8 DCT system shown in FIG. 1 performs the computation defined by equation 6 in the following two steps using one of the addition and subtraction circuit and the multiplication and addition circuit each:

Step 1: $[S]=[Q][X]$

Step 2: $[C]=\frac{1}{2}\times[R][S]$

The matrices [Q] and [R] are defined by the above-mentioned equations 9 and 8. Further, the matrix [X] is a vector constituted by eight elements in each column of 8×8 original data in a real domain. The matrix [C] is the vector transformed to a frequency domain and is comprised of eight elements.

The input register 1 receives serially every word of the original data [X] at every clock cycle. The original data [X] is comprised of eight elements, so eight clock cycles are required for registering all of the data of the original data [X] in the input register 1.

The addition and subtraction circuit 2 performs the calculation of step 1.

The intermediate value holding circuit temporarily holds the results of the calculation of the addition and subtraction circuit 2.

The multiplication and addition circuit 4 performs the calculation of step 2.

The output register 5 serially outputs by every word in the data [C] on the frequency at every clock cycle.

Below, for simplification, it is considered that the addition and subtraction is performed one time and the multiplication and addition is completed in a one clock cycle. The addition and subtraction circuit 2 and the addition and subtraction circuit 4 complete the predetermined addition and subtraction, and multiplication and addition in eight clock cycles each.

Explanation of Operation of Step 1

At step 1, a calculation is performed to multiply the constant matrix [Q] shown in equation 9 with the coefficients of 1, −1, and 0 with the original data [X].

The vectors [S] and [X] in the calculation step 1

$$[S]=[Q][X]$$

are shown in the following equations 12 and 13:

$$[S] = \begin{pmatrix} s_0 \\ s_1 \\ s_2 \\ s_3 \\ s_4 \\ s_5 \\ s_6 \\ s_7 \end{pmatrix} \quad (12)$$

$$[X] = \begin{pmatrix} x_0 \\ x_1 \\ x_2 \\ x_3 \\ x_4 \\ x_5 \\ x_6 \\ x_7 \end{pmatrix} \quad (13)$$

The results of the computation at step 1 are shown by the following equation 14:

$$s_0 = x_1 + x_2 + x_3 + x_4 + x_5 + x_6 + x_7$$

$$s_1 = x_0 - x_1 - x_2 + x_3 + x_4 - x_5 - x_6 + x_7$$

$$s_2 = x_1 - x_2 - x_5 + x_6$$

$$s_3 = x_0 - x_3 - x_4 + x_7$$

$$s_4 = x_3 - x_4$$

$$s_5 = x_2 - x_5$$

$$s_6 = x_1 - x_6$$

$$s_7 = x_0 - x_7 \quad (14)$$

The calculation of step 1 is performed using the addition and subtraction circuit 2.

Figure 2:
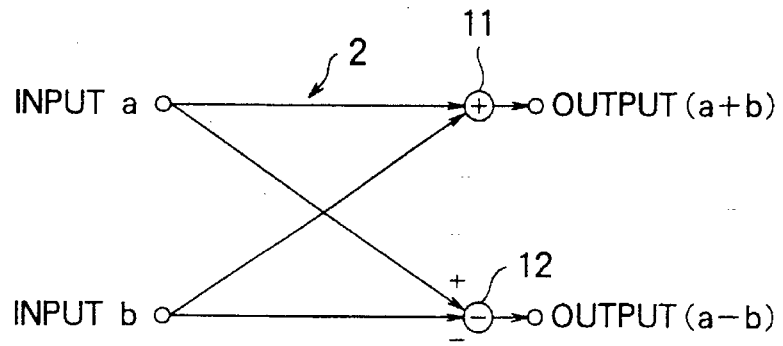
FIG. 2 is a chart of the basic structure of an addition and subtraction circuit of an 8×8 DCT system of the present invention.
Figure 3:
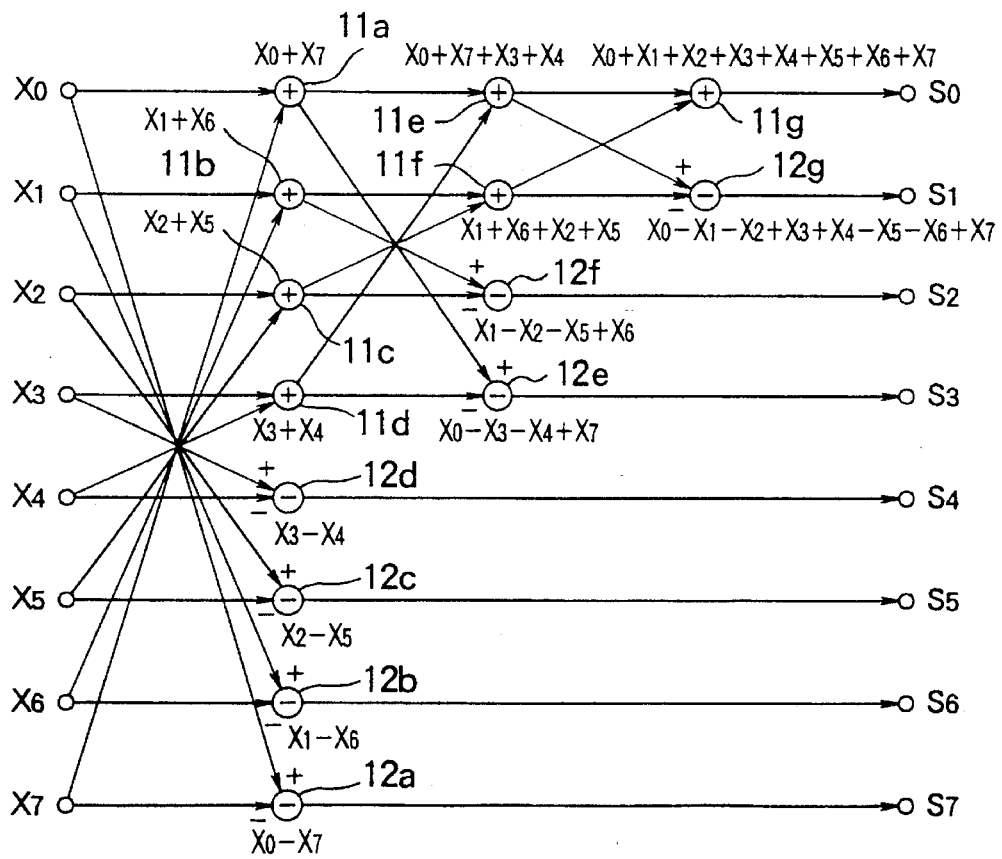
FIG. 3 is a chart of the concept of signal processing at the time of performing the calculation of step 1 using the addition and subtraction circuit of an 8×8 DCT system of the present invention.

FIG. 2 is the basic structure of the addition and subtraction circuit 2, while FIG. 3 illustrates the concept of signal processing of the addition and subtraction circuit 2 for performing processing together with the basic circuit shown in FIG. 2. Further, FIG. 4 is a chart for explaining the timing for performing signal processing using the addition and subtraction circuit 2 shown in FIG. 2.

In FIG. 2, the basic circuit of the addition and subtraction circuit 2 is comprises a pair including an adder 11 and a subtractor 12. The input data a and b are input to the adder 11 and the subtractor 12. The adder 11 outputs the result of addition of a and b (a+b), while the subtractor 12 outputs the result of subtraction of a and b (a−b).

In FIG. 3, the addition and subtraction circuit 2 is used seven times to obtain the eight elements ($s_0$ to $s_7$) of the vector [S], so when performing the calculation using a single addition and subtraction circuit 2, as shown in FIG. 4, the eight elements of the vector [S] are held in the intermediate value holding circuit 3 for seven clock cycles.

That is, the addition and subtraction circuit 2 performs the following:

(1) It uses the pair comprising the first stage adder 11a and subtractor 12a to perform the addition and subtraction of $x_0$ and $x_7$ at the clock cycle 0, the adder 11a outputs the result of addition ($x_0+x_7$), and the subtractor 12a outputs the result of subtraction ($x_0-x_7$).

At this time, the output of the subtractor 12 ($x_0-x_7$) becomes $s_7$.

(2) At the clock cycle 1, it uses the pair comprising the second stage adder 11b and subtractor 12b to perform the addition and subtraction of $x_1$ and $x_6$, the adder 11b outputs the result of addition ($x_1+x_6$), and the subtractor 12b outputs the result of subtraction ($x_1-x_6$).

At this time, the output of the subtractor 12b ($x_1-x_6$) becomes $s_6$.

(3) At the clock cycle 2, it uses the pair comprising the third stage adder 11c and subtractor 12c to perform the addition and subtraction of $x_2$ and $x_5$, the adder $11c$ outputs the result of addition $(x_2+x_5)$, and the subtractor $12c$ outputs the result of subtraction $(x_2-x_5)$.

At this time, the output of the subtractor $12b$ $(x_2-x_5)$ becomes $s_5$. (4) At the clock cycle 2, it uses the pair comprising the fourth stage adder $11d$ and subtractor $12d$ to perform the addition and subtraction of $x_3$ and $x_4$, the adder $11d$ outputs the result of addition $(x_3+x_4)$, and the subtractor $12d$ outputs the result of subtraction $(x_3-x_4=s_4)$.

At this time, the output of the subtractor $12d$ $(x_3-x_4)$ becomes $s_4$.

(5) At the clock cycle 4, it uses the pair of the fifth stage adder $11e$ and subtractor $12e$ to perform the addition and subtraction of the inputs $(x_0+x_7)$ and $(x_3+x_4)$, the adder $11e$ outputs the result of addition $(x_0+x_7+x_3+x_4)$, and the subtractor $12e$ outputs the result of subtraction $(X_0-X_3-X_4+X_7=s_3)$.

At this time, =he output of the subtractor $12e$ $(x_0-x_3-x_4+x_7)$ becomes $s_3$.

(6) At the clock cycle 5, it uses the pair of the sixth stage adder $11f$ and subtractor $12f$ to perform the addition and subtraction of the inputs $(x_1+x_6)$ and $(x_2+x_5)$, the adder $11f$ outputs the result of addition $(x_1+x_6+x_2=x_5)$, and the subtractor $12f$ outputs the result of subtraction $(x_1-x_2-x_5+x_6=s_2)$.

At this time, the output of the subtractor $12f$ $(x_1-x_2-x_5+x_6)$ becomes $s_2$.

(7) At the clock cycle 6, it uses the pair of the seventh stage adder $11g$ and subtractor $12g$ to perform the addition and subtraction of the inputs $(x_0+x_7+x_3+x_4)$ and $(x_1+x_6+x_2+x_5)$, the adder $11g$ outputs the result of addition $(x_0+x_1+x_2+x_3+x_4+x_5+x_6+x_7=s_0)$, and the subtractor $12g$ outputs the result of subtraction $(x_0-x_1-x_2-x_3+x_4-x_5-x_6+x_7=s_1)$.

At this time, the output of the subtractor $12g$ $(x_0+x_1+x_2+x_3+x_4+x_5+x_6+x_7)$ becomes $s_1$.

In this way, the eight elements ($s_0$ to $s_7$) of the vector [S] are output to the intermediate value holding circuit 3 during seven clock cycles.

If the speed of calculation of the adder 11 and the subtractor 12 in the addition and subtraction circuit 2 is slow and the addition and subtraction is not finished in one clock cycle, one may constitute the addition and subtraction circuit 2 as a plurality of unit circuits each unit pair comprising the adder 11 and the subtractor (12) for making the speed of calculation fall within an allowable time (eight clock cycles) for operation without disturbance of the pipeline.

For example, when the adder 11 and the subtractor 12 complete the addition and subtraction operation within two clock cycles, the addition and subtraction circuit 2 may comprise two unit circuits.

Further, the addition and subtraction circuit 2 does not have to be a unit pair comprising the adder 11 and the subtractor 12, but may connect the number of adders 11 and subtractors 12 necessary.

Explanation of Operation of Step 2

At step 2, a calculation is performed to multiply the matrix [Q] shown in equation 9 having at most four irrational numbers per column. The vectors [C] and [S] in the calculation equation of step 2

$$[C] = \frac{1}{2} \times [R][S]$$

are shown in the following equations 15 and 16:

$$[C] = \begin{pmatrix} c_0 \\ c_1 \\ c_2 \\ c_3 \\ c_4 \\ c_5 \\ c_6 \\ c_7 \end{pmatrix} \quad (15)$$

$$[S] = \begin{pmatrix} s_0 \\ s_1 \\ s_2 \\ s_3 \\ s_4 \\ s_5 \\ s_6 \\ s_7 \end{pmatrix} \quad (16)$$

The results of the operation at step 2 are shown by the following equation 17. However, in the calculation equations of step 2, the results of calculation of [R] [S] are halved in the end. This is because the output of [R] [S] may be shifted two bits to the right, so the circuit does not require a particular multiplication circuit or division circuit.

$$c_0 = A \cdot s_0$$

$$c_1 = G \cdot s_4 = F \cdot s_5 + E \cdot s_6 + D \cdot s_7$$

$$c_2 = c \cdot s_2 + B \cdot s_3$$

$$c_3 = -F \cdot s_4 - D \cdot s_5 - G \cdot s_6 + E \cdot s_7$$

$$c_4 = A \cdot s_1$$

$$c_5 = E \cdot s_4 + G \cdot s_5 - D \cdot s_6 + F \cdot s_7$$

$$c_6 = -B \cdot s_2 + c \cdot s_3$$

$$c_7 = -D \cdot s_4 + E \cdot s_5 - F \cdot s_6 + G \cdot s_7 \quad (17)$$

The calculation of step 2 is performed using the multiplication and addition circuit 4.

Figure 5A:
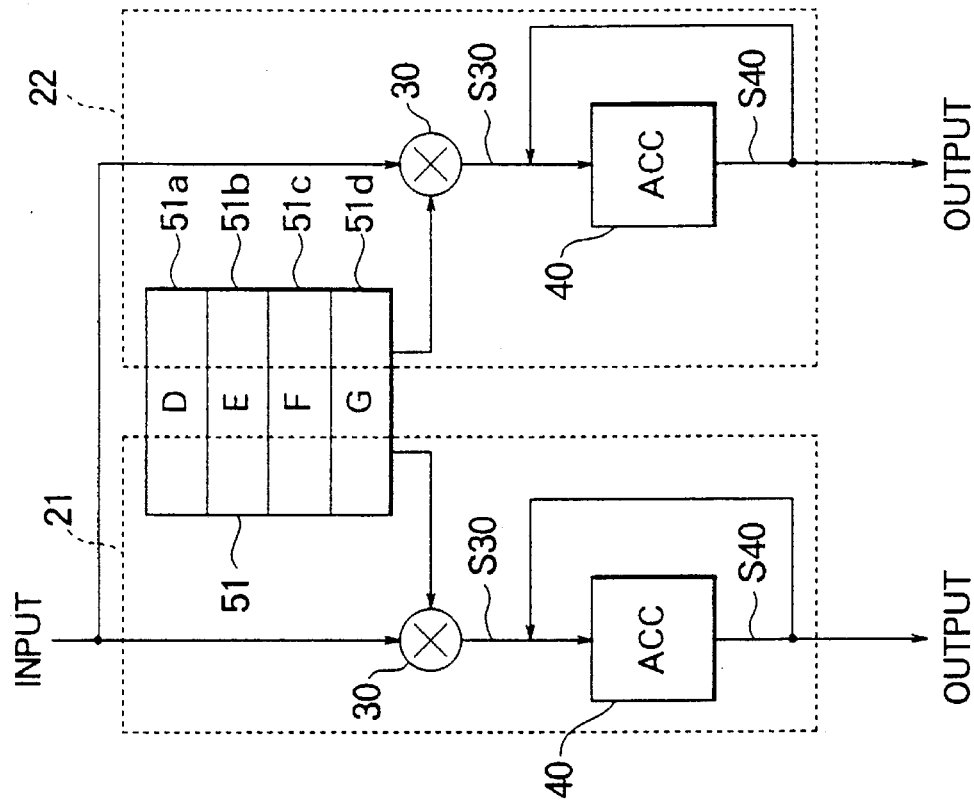
FIGS. 5a and 5b are circuit diagrams showing circuit structures of the multiplication and addition circuit of an 8×8 DCT system of the present invention.
Figure 5B:
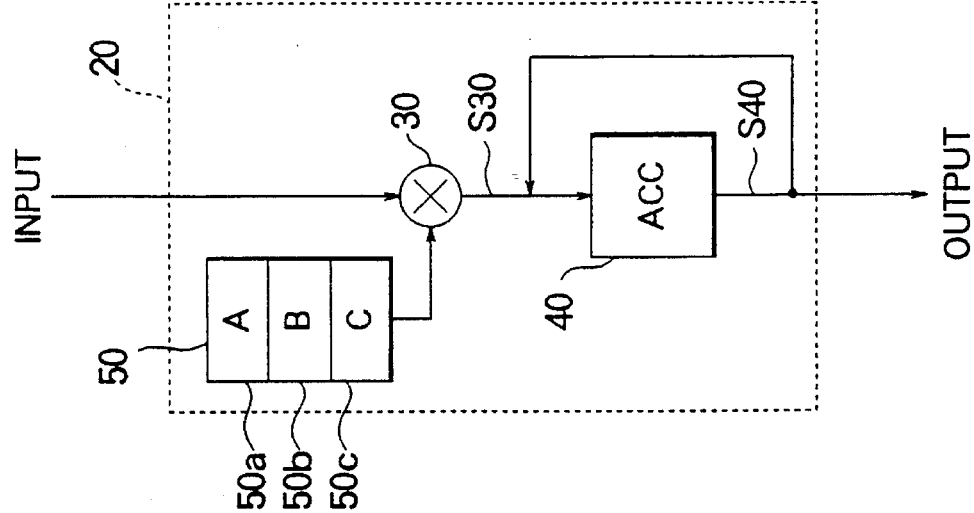

FIG. 5 illustrates an exemplary structure of the multiplication and addition circuit 4. The multiplication and addition circuit 4 includes a multiplier 20, a multiplier 21, and a multiplier 22.

The multiplier 20 comprises of a multiplier 30, an accumulator 40, and a coefficient storage memory 50. The multiplication and addition circuit 4 applies the input data to the multiplier 30 at a certain clock k. The multiplier 30 performs multiplication between the input data and the coefficient A stored in the coefficient storage region $50a$ of the coefficient storage memory 50 the coefficient, B stored in the coefficient storage area $50b$, or the coefficient C stored in the coefficient storage area $50c$ and outputs the result of the multiplication as the signal S30 to the accumulator 40. The accumulator 40 performs addition or subtraction of the results of multiplication input as the signal S30 from the multiplier 30 and the result of multiplication input from the multiplier 30 at the previous clock cycle (k−1) and outputs the result of the addition and subtraction as S40.

Therefore, the n-th inner product computation can be realized during n clock cycles.

The structure of the multiplier 21 and the multiplier 22 are the same as that of the above-mentioned multiplier 20 except that the coefficients D, E, F, and G, used in the multiplier 21 and the multiplier 22, are stored in the coefficient storage memory 51.

Further, the multiplier 21 and the multiplier 22 perform calculations using the same coefficients, so may be constituted to share the coefficient storage memory 51.

FIG. 6 is a chart for explaining the timing of the signal processing in the case of performing the calculation of step 2 using the multiplier 20, the multiplier 21, and the multiplier 22.

The timing of the signal processing when performing the calculation of step 1 using the multiplier 20 will be explained.

(1a) At the clock cycle 0, it receives as input $s_0$, performs multiplication between $s_0$ and the coefficient A stored in the coefficient storage area 50a, and outputs the result of the multiplication ($A \cdot s_0$) to the accumulator 40 as the signal S30. The accumulator 40 outputs the result of the multiplication ($A \cdot s_0$) as the signal S40. At this time, the signal S40 becomes the element $c_0$ of the matrix [C].

(2a) At the clock cycle 1, it receives as input $s_1$, performs multiplication between $s_1$ and the coefficient A stored in the coefficient storage area 50a, and outputs the result of the multiplication ($A \cdot s_1$) to the accumulator 40 as the signal S30. The accumulator 40 outputs the result of the multiplication ($A \cdot s_1$) as the signal S40. At this time, the signal S40 becomes the element $c_4$.

(3a) At the clock cycle 2, it receives as input $s_2$, performs multiplication between $s_2$ and the coefficient C stored in the coefficient storage area 50c, and outputs the result of the multiplication ($C \cdot s_2$) to the accumulator 40 as the signal S30. The accumulator 40 outputs the result of the multiplication ($C \cdot s_2$) as the signal S40 and, simultaneously, holds the result of multiplication ($C \cdot s_2$).

(4a) At the clock cycle 3, it receives as input $s_3$, performs multiplication between $s_3$ and the coefficient B stored in the coefficient storage area 50b, and outputs the result of the multiplication ($B \cdot s_3$) to the accumulator 40 as the signal S30. The accumulator 40 performs addition of the result of the multiplication ($B \cdot s_3$) and the result of multiplication ($C \cdot s_2$) held at the previous clock cycle 2 and outputs the result of the addition ($C \cdot s_2 + B \cdot s_3$) as the signal S40. At this time, the signal S40 becomes $c_2$.

(5a) At the clock cycle 4, it receives as input $s_2$, performs negative multiplication between $s_2$ and the coefficient B stored in the coefficient storage area 50a, and outputs the result of the multiplication ($-B \cdot s_2$) to the accumulator 40 as the signal S30. The accumulator 40 outputs the result of the multiplication ($-B \cdot s_2$) as the signal S40 and simultaneously holds the result of multiplication ($-B \cdot s_2$).

(6a) At the clock cycle 5, it receives as input $s_3$, performs multiplication between $s_3$ and the coefficient C stored in the coefficient storage area 50c, and outputs the result of the multiplication ($C \cdot s_3$) to the accumulator 40 as the signal S30. The accumulator 40 performs the addition of the result of the multiplication ($C \cdot s_3$) and the previous result of multiplication ($-B \cdot s_2$) held at the clock cycle 4 and outputs the result of addition ($-B \cdot s_2 + C \cdot s_3$) as the signal S40. At this time, the signal S40 becomes $c_6$.

Next, an explanation will be given of the timing of signal processing when performing the calculation of step 2 using the multiplier 21 and the multiplier 22.

(1b) At the clock cycle 0, the multiplier 21 and the multiplier 22 each receive as input $s_4$, perform multiplications with the coefficient G stored in the coefficient storage region 51d and the coefficient E. stored in the coefficient storage region 51b, and output the results of multiplication ($G \cdot s_2$) and ($E \cdot s_2$) as the signals S30 to the accumulator 40. The accumulator 40 outputs the results of multiplication as the signals S40 and simultaneously holds the same.

(2b) At the clock cycle 1, the multiplier 21 and the multiplier 22 each receive as input $s_5$, perform multiplications with the coefficient F stored in the coefficient storage region 51c and the coefficient G stored in the coefficient storage region 51d, and output the results of multiplication ($F \cdot s_5$) and ($G \cdot s_5$) as the signals 830 to the accumulator 40. The accumulator 40 performs addition of the results of the multiplication and the previous results of multiplication ($G \cdot s_4$) and ($E \cdot s_4$) held at the clock cycle 0, and outputs the results of the addition ($Gs_4 + Fs_5$) and ($Es_4 + Gs_5$) and simultaneously holds the same.

(3b) At the clock cycle 2, the multiplier 21 and the multiplier 22 each receive as input $s_6$, perform negative multiplications with the coefficient E stored in the coefficient storage region 51b and the coefficient D stored in the coefficient storage region 51a, and output the results of multiplication ($Es_6$) and ($-Ds_6$) as the signals S30 to the accumulator 40. The accumulator 40 performs addition of the results of the multiplication and the previous results of multiplication ($Gs_4 + Fs_5$) and ($Es_4 + Gs_5$) held at the clock cycle 1, and outputs the results of the addition ($Gs_4 + F \cdot s_5 + Es_6$) and ($Es_4 + G \cdot s_5 - Ds_6$) and simultaneously holds the same.

(4b) At the clock cycle 3, the multiplier 21 and the multiplier 22 each receive as input $s_7$, perform multiplications with the coefficient D stored in the coefficient storage region 51a and the coefficient F stored in the coefficient storage region 51c, and output the results of multiplication ($Ds_7$) and ($Fs_7$) as the signals S30 to the accumulator 40. The accumulator 40 performs addition of the results of the multiplication and the previous results of addition ($Gs_4 + F \cdot s_5 + Es_6$) and ($Es_4 + G \cdot s_5 - Ds_6$) held at the clock cycle 2, and outputs the results of addition ($Gs_4 + F \cdot s_5 + Es_6 + Ds_7$) and ($Es_4 + G \cdot s_5 + Ds_6 + Fs_7$) as the signal S40. At this time, ($Gs_4 + F \cdot s_5 + Es_6 + Ds_7$) and ($Es_4 + G \cdot s_6 + Ds_6 + Fs_7$) become $c_1$ and $c_5$, respectively.

(5b) At the clock cycle 4 to clock cycle 7, the multiplier 21 and the multiplier 22 each receive as input $s_4$ at the clock cycle 4, receive as input $s_5$ at the clock cycle 5, receive as input $s_6$ at the clock cycle 6, receive as input $s_7$ at the clock cycle 7, perform calculations in the same way as the above (1b) to (4b), and output $c_3$ ($-Fs_4 + Ds_5 - Gs_6 + ES_7$) and ($-Ds_4 + Es_5 - Fs_6 + Gs_7$) as the signal S40.

In this way, the eight elements ($c_0$ to $c_7$) of the vector [S] are output to the output register 5 during seven clock cycles.

If the speed of calculation of the multiplication and addition circuits 20, 21, and 22 is slow and the multiplication and addition cannot be performed in one clock cycle, calculating may be performed using a plurality of multiplication and addition circuits 20, 21, and 22 so that the calculation time falls within the allowable time (eight clock cycles) for operation without disturbing the pipeline.

For example, when the multiplication and addition operation is completed in two clock cycles, two each of the multiplication and addition circuits 20, 21, and 22 may be used and the calculation is performed using six multiplication and addition circuits, the multiplication and addition circuits 20a, 20b, 21a, 21b, 22a and 22b. In this case, a calculation is performed by the multiplication and addition circuit 20 a to obtain the $c_0$ and $c_4$ of (1a) to (3a), and a calculation is performed by the second multiplication and addition circuit 20b to find $c_2$ and $c_6$ of (4a) to (6a).

Further, the calculation is performed by the multiplication and addition circuit 21a to obtain $c_1$ of (1b) to (4b), while a calculation is performed by the multiplication and addition circuit 21b to obtain $c_3$ of (5b).

Further, a calculation is performed by the multiplication and addition circuit 22ab to obtain $c_5$ of (1b) to (4b) and a calculation is performed by the multiplication and addition circuit 21b to obtain $c_7$ of (5b).

In this way, in the 8×8 DCT system of the present invention, at the time of performing the 8×8 DCT calculation, the vector [C] comprised of the eight elements of the columns of the matrix data [C] in the frequency domain is calculated by the processing of the above-mentioned step 1 and step 2 on the vector [X] comprised of the eight elements of the columns of the original data [X]. This calculation is performed for the eight columns of the data [X] so that the data [C] in the frequency domain comprised of 64 elements is obtained.

The number of multiplications required at the time of obtaining the eight elements of the columns of the vector [C] is just the 22 operations performed at step 2, so the number of multiplications required when obtaining the frequency data [C] (64 elements) becomes 22×8 columns=176.

In this way, in the 8×8 DCT system of the present invention, it is possible to reduce the number of multiplications 80 times compared with the conventional 8×8 DCT system. Also, when the multiplication and additions are completed in one clock cycle, the multiplication and addition circuits used may be the three multiplication and addition circuits 20, 21, and 22 and therefore the circuit structure can be simplified.

Further, the number of operations involving irrational numbers is reduction in, so it is possible to reduce the accumulation error caused by approximation of irrational numbers.

As a hardware circuit realizing the 8×8 DCT system of the present invention, consideration may be given to an electronic circuit performing the above computational processing, a DSP (digital signal processor), a circuit using semiconductor devices, etc. This circuit structure may also be applied to the following 8×8 DCT system and 8×8 IDCT system.

Next, an explanation will be made of an 8×8 IDCT system for performing an inverse operation of the 8×8 DCT system mentioned above.

Figure 7:
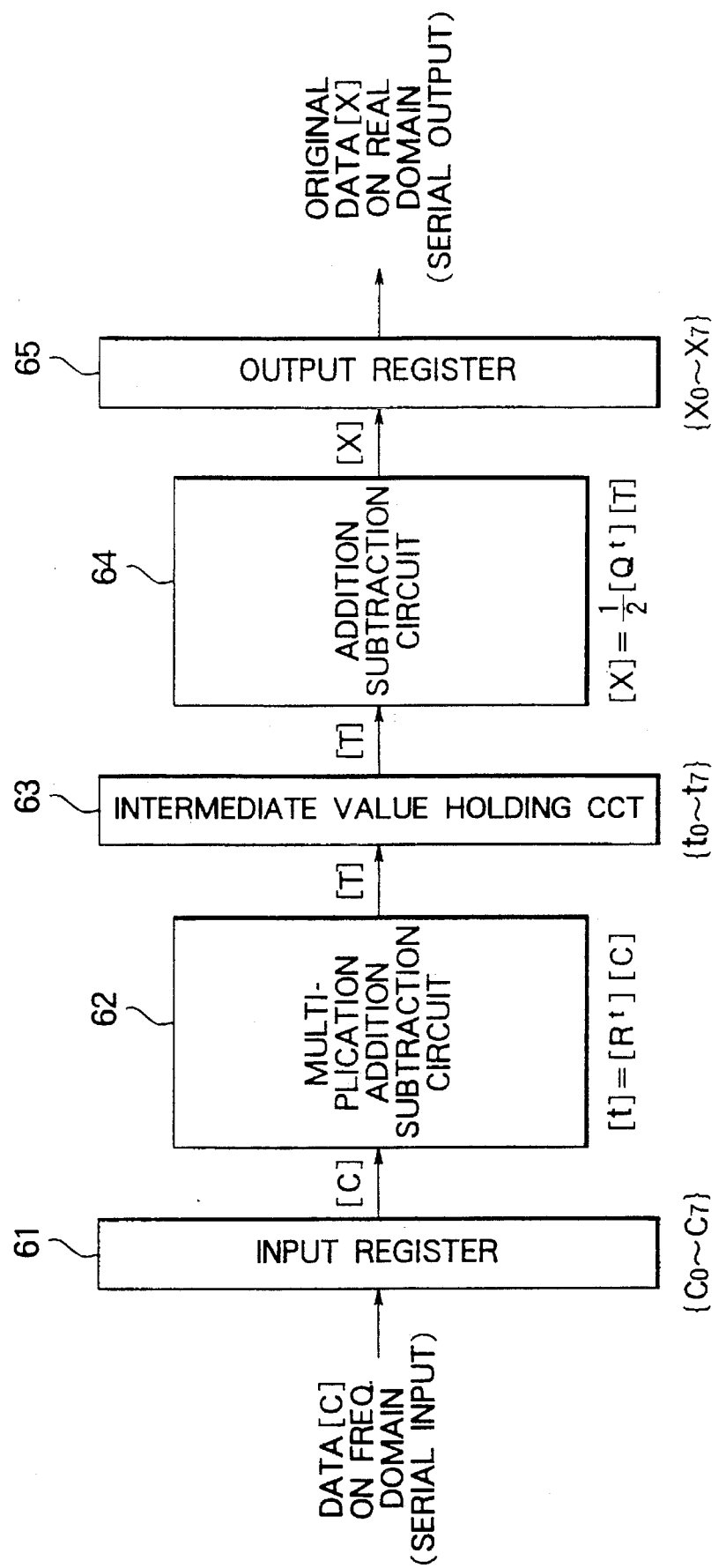
FIG. 7 is a circuit diagram showing the circuit structure of the 8×8 IDCT system of the present invention.

FIG. 7 is a view of the structure of the 8×8 IDCT system in FIG. 7, the 8×8 IDCT system includes an input register 61, a multiplication and addition circuit 62, an intermediate value holding circuit 63, an addition and subtraction circuit 64, and an output register 65.

This system comprises a two-stage pipeline structure consisting of the multiplication and addition circuit 62 as a first stage, and the addition and subtraction circuit 64 as the second stage through the intermediate value holding circuit 63.

The 8×8 IDCT system shown in FIG. 7 performs the operation defined in equation 7 in the following two steps using the multiplication and addition circuit 62 and the addition and subtraction circuit 64.

Step 1: $[T]=[R^t][C]$

Step 2: $[X]=\frac{1}{2}\times[Q^t][T]$

The matrices $[R^t]$, $[Q^t]$ are transposition matrices and defined in the above-mentioned equations 10 and 11.

The matrices [X] and [C], respectively, like in the case of the above-mentioned 8×8 DCT, are a vector showing the eight elements of the columns of the original data [X] in a real domain, and a vector obtained by transformation of the vector [X] to a frequency domain.

An explanation will next be given of the structure of the 8×8 IDCT system.

The input register 61 receives serially each word of the data [C] in the frequency domain at every clock cycle. The matrix [C] is comprised of eight elements, so it takes eight clock cycles to register all the data of the matrix [C] in the input register 61.

The multiplication and addition circuit 61 performs the calculation of step 1.

The intermediate value holding circuit 63 temporarily holds the result of the operation of the multiplication and addition circuit 62.

The addition and subtraction circuit 64 performs the calculation of step 2.

The output register 65 outputs serially each word of the original data [X] at every clock cycle.

Below, for simplification, it is considered that the addition is performed one time and the multiplication and addition is completed in one clock cycle. The multiplication and addition circuit 62 and the addition and subtraction circuit 64 complete the predetermined multiplication and addition computation, and addition and subtraction computation, in eight clock cycles.

Explanation of Operation of Step 1

At step 2, calculation is Performed to multiply the transposition matrix $[R^t]$ shown in equation 10 having at most four irrational numbers per column with the data [C] in the frequency domain.

The vector [T] in the calculation equation of step 1

$[T]=[R^t][C]$ is shown in the following equation 18:

$$[T] = \begin{pmatrix} t_0 \\ t_1 \\ t_2 \\ t_3 \\ t_4 \\ t_5 \\ t_6 \\ t_7 \end{pmatrix} \quad (18)$$

The results of the operation at step 1 are shown by the following equation 19.

$t_0 = A \cdot c_0$ $t_1 = A \cdot c_4$ $t_2 = C \cdot c_2 - B \cdot c_6$ $t_3 = B \cdot c_2 + C \cdot c_6$ $t_4 = G \cdot c_1 - F \cdot c_3 + E \cdot c_5 - D \cdot c_7$ $t_5 = F \cdot c_1 - D \cdot c_3 + G \cdot c_5 + E \cdot c_7$ $t_6 = E \cdot c_1 - G \cdot c_3 - D \cdot c_5 - F \cdot c_7$ $t_7 = D \cdot c_1 + E \cdot c_5 + F \cdot c_5 - G \cdot c_7 \quad (19)$ The calculation of step 1 is performed using the multiplication and addition circuit 62. The multiplication and addition circuit 62 is the same as the multiplication and addition circuit 4 of the 8×8 DCT system mentioned above and is comprised of the multiplication and addition circuits 20, 21, and 22.

FIG. 8 is a chart for explaining the timing of the signal processing in the case of performing the calculation of step 1 using the multiplier 20, the multiplier 21, and the multiplier 22.

(1a) At the clock cycle 0, it receives as input $c_0$, performs multiplication between $c_0$ and the coefficient A stored in the coefficient storage area 50a, and outputs the result of the multiplication ($A \cdot c_0$) to the accumulator 40 as the signal S30. The accumulator 40 outputs the result of the multiplication ($A \cdot c_0$) as the signal S40. At this time, the signal S40 becomes $t_0$.

(2a) At the clock cycle 1, it receives as input $c_4$, performs multiplication between $c_4$ and the coefficient A stored in the coefficient storage area 50a, and outputs the result of the multiplication ($A \cdot c_4$) to the accumulator 40 as the signal S40. The accumulator 40 outputs the result of the multiplication ($A \cdot c_4$) as the signal S40. At this time, the signal S40 becomes $t_1$.

(3a) At the clock cycle 2, it receives as input $c_2$, performs multiplication between $c_2$ and the coefficient C stored in the coefficient storage area 50c, and outputs the result of the multiplication ($C \cdot c_2$) to the accumulator 40 as the signal S30. The accumulator 40 outputs the result of the multiplication ($C \cdot c_2$) as the signal S40 and, simultaneously, holds the result of multiplication ($C \cdot c_2$).

(4a) At the clock cycle 3, it receives as input $c_6$, performs negative multiplication between $c_6$ and the coefficient B stored in the coefficient storage area 50b, and outputs the result of the multiplication ($-B \cdot c_6$) to the accumulator 40 as the signal S30. The accumulator 40 performs addition of the result of the multiplication ($-B \cdot c_6$) and the result of multiplication held at the previous clock cycle 2 ($C \cdot c_2$) and outputs the result of the addition ($C \cdot c_2 - B \cdot c_3$) as the signal S40. At this time, the signal S40 becomes $t_2$.

(5a) At the clock cycle 4, it receives as input $s_2$, performs multiplication between this $c_2$ and the coefficient B stored in the coefficient storage area 50b, and outputs the result of the multiplication ($B \cdot c_2$) to the accumulator 40 as the signal S30. The accumulator 40 outputs the result of the multiplication ($B \cdot c_2$) as the signal S40 and simultaneously holds the result of multiplication ($B \cdot c_2$).

(6a) At the clock cycle 5, it receives as input $c_6$, performs multiplication of $c_6$ with the the coefficient C stored in the coefficient storage region 50c, and outputs the result of multiplication ($C \cdot c_6$) as the signal S30 to the accumulator 40. The accumulator 40 performs addition of the result of multiplication ($C \cdot c_6$) and the result of multiplication ($B \cdot c_2$) held at the clock cycle 4 and outputs the result of addition ($B \cdot c_2 + C \cdot c_6$) as the signal S40. At this time, the signal S40 becomes $t_3$.

Next, an explanation will be given of the timing of signal processing when performing the calculation of step 1 using the multiplier 21 and the multiplier 22.

(1b) At the clock cycle 0, the multiplier 21 and the multiplier 22 each receive as input $c_1$, perform multiplications with the coefficient G stored in the coefficient storage region 51d and E stored in the coefficient storage region 51b, and output the results of multiplication ($G \cdot c_1$) and ($E \cdot c_1$) as the signals S30 to the accumulator 40. The accumulator 40 outputs the results of multiplication as the signals S40 and simultaneously holds the same.

(2b) At the clock cycle 1, the multiplier 21 and the multiplier 22 each receive as input $c_3$, perform negative multiplications with the coefficient F stored in the coefficient storage region 51c and the coefficient G stored in the coefficient storage region 51d, and output the results of multiplication ($-F \cdot c_3$) and ($-G \cdot c_3$) as the signals S30 to the accumulator 40. The accumulator 40 performs addition of the results of the multiplication and the previous results of multiplication ($G \cdot c_1$) and ($E \cdot c_1$) held at the clock cycle 0, and outputs the results of the addition ($Gc_1 - Fc_3$) and ($Ec_1 - Gc_3$) and simultaneously holds the same.

(3b) At the clock cycle 2, the multiplier 21 and the multiplier 22 each receive as input $c_5$, perform negative multiplications with the coefficient E stored in the coefficient storage region 51b and the coefficient D stored in the coefficient storage region 51a, and output the results of multiplication ($Ec_5$) and ($-Dc_5$) as the signals S30 to the accumulator 40. The accumulator 40 performs addition of the results of the multiplication and the previous results of addition ($Gc_1 - Fc_3$) and ($Ec_1 - Gc_3$) held at the clock cycle 0, and outputs the results of the addition ($Gc_1 - F \cdot c_3 + Ec_5$) and ($Ec_1 - G \cdot c_3 - Dc_5$) and simultaneously holds the same.

(4b) At the clock cycle 3, the multiplier 21 and the multiplier 22 each receive as input $c_7$, perform negative multiplications with the coefficient D stored in the coefficient storage region 51a and the coefficient F stored in the coefficient storage region 51c, and output the results of multiplication ($-Dc_7$) and ($-Fc_7$) as the signal S30 to the accumulator 40. The accumulator 40 performs addition of the results of the multiplication and the results of addition ($Gc_1 - F \cdot c_3 + Ec_5$) and ($Ec_1 - G \cdot c_3 - Dc_5$) held at the clock cycle 2, and outputs the results of addition ($Gc_1 - F \cdot c_3 + Ec_5 - Dc_7$) and ($Ec_1 - G \cdot c_3 - Dc_5 - Fc_7$) as the signal S40. At this time, ($Gc_1 - F \cdot c_3 + Ec_5 - Dc_7$) and ($Ec_1 - G \cdot c_3 - Dc_5 - Fc_7$) become $t_4$ and $t_6$, respectively.

(5b) During the clock cycle 4 to clock cycle 7, the multiplier 21 and the multiplier 22 each receive as input $c_1$ at the clock cycle 4, receive as input $c_3$ at the clock cycle 5, receive as input $c_5$ at the clock cycle 6, receive as input $c_7$ at the clock cycle 7, perform calculations in the same way as the above (1b) to (4b), and output $t_5$ ($Fc_1 - DC_3 + Gc_5 + Ec_7$) and $t_7$ ($Dc_3 + Ec_3 + Fc_5 + Ec_7$) as the signal S40.

In this way, the eight elements ($t_0$ to $t_7$) of the vector [T] are output to the intermediate value holding circuit 3 during seven clock cycles.

If the speed of calculation of the multiplication and addition circuits 20, 21, and 22 is slow and the multiplication and addition cannot be performed in one clock cycle, the calculation may be performed using a plurality of multiplication and addition circuits 20, 21, and 22 in the same way as the above-mentioned 8×8 DCT system.

Explanation of Operation of Step 2

At step 2, multiplication is performed on the output ($t_0$ to $t_7$) of step 1 with the transposition matrix [$Q^t$] shown in equation 11 with coefficients of 1, −1, and 0.

The result of the operation of the calculation equation of step 2

$$[X] = \tfrac{1}{2} \times [Q^t] [T]$$

is shown by the following equation 20.

$$x_0 = t_0 + t_1 + t_3 + t_7$$
$$x_1 = t_0 - t_1 + t_2 + t_6$$
$$x_2 = t_0 - t_1 - t_2 + t_5$$
$$X_3 = t_0 + t_1 - t_3 + t_4$$
$$x_4 = t_0 + t_1 - t_3 - t_4$$
$$x_5 = t_0 - t_1 - t_2 - t_5$$
$$x_6 = t_0 - t_1 + t_2 - t_6$$
$$X_7 = t_0 + t_1 + t_3 - t_7 \qquad (20)$$

In the calculation equation of step 2, the result of the calculation of [$Q^t$] [T] is halved in the end, but this may be done by shifting the output of the [Q'] [T] 2 bits to the right, so there is no particular need for a calculation circuit.

Figure 9:
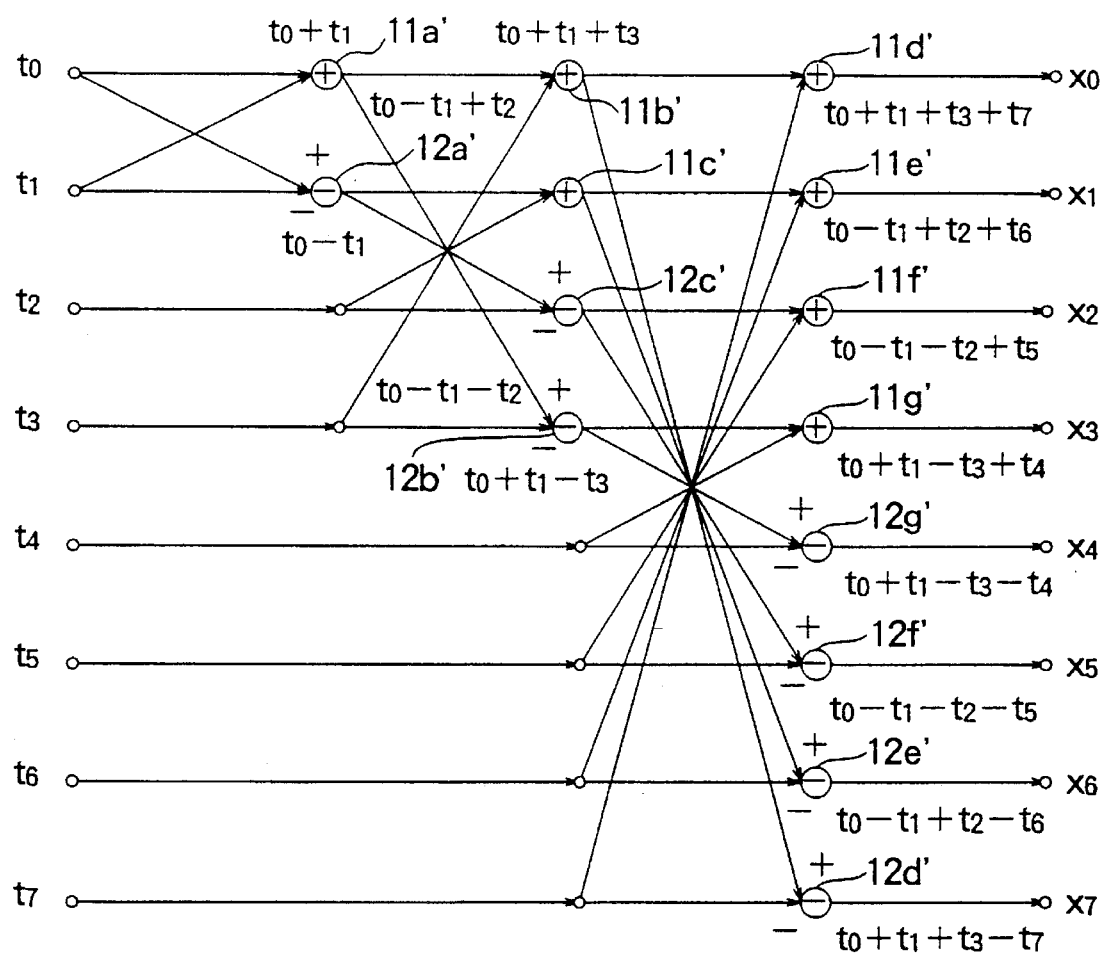
FIG. 9 is a chart showing a graph of the signal flow of the calculation of step 2 of an 8×8 IDCT system of the present invention.

FIG. 9 is an illustration of the concept of the signal processing of the addition and subtraction circuit 2 for performing the processing together with the basic circuit of the addition and subtraction circuit 64. Further, FIG. 10 is a chart for explaining the timing for performing signal processing using the addition and subtraction circuit 64 shown in FIG. 10.

As shown in FIG. 9, the addition and subtraction circuit 64 is used seven times to find the eight elements ($x_0$ to $x_7$) of the vector [X], so when performing the calculation using a single addition and subtraction circuit 64, as shown in FIG. 10, the eight elements of the vector [X] are output to the intermediate value holding circuit 63 during seven clock cycles.

That is, the addition and subtraction circuit 65 performs the following:

(1) At the clock cycle 0, it uses the pair comprising the first stage adder 11a' and subtractor 12a' to perform the addition and subtraction of $t_0$ and $t_1$, the adder 11a' outputs the result of addition ($t_0+t_1$), and the subtractor 12a' outputs the result of subtraction ($t_0 t_1$).

(2) At the clock cycle 1, it uses the pair comprising the second stage adder 11b' and subtractor 12b' to perform the addition and subtraction of the input ($t_0+t_1$) and $t_3$, the adder 11b' outputs the result of addition ($t_0+t_1+t_3$), and the subtractor 12b' outputs the result of subtraction ($t_0+t_1-t_3$).

(3) At the clock cycle 2, it uses the pair comprising the third stage adder 11c' and subtractor 12c' to perform the addition and subtraction of the input ($t_0-t_1$) and $t_2$, the adder 11c' outputs the result of addition ($t_0-t_1+t_2$), and the subtractor 12c' outputs the result of subtraction ($t_0-t_1-t_2$).

(4) At the clock cycle 3, it uses the pair comprising the fourth stage adder 11d' and subtractor 12d' to perform the addition and subtraction of the input ($t_0+t_1+t_3$) and $t_7$, the adder 11d' outputs the result of addition ($t_0+t_1+t_7=x_0$), and the subtractor 12d' outputs the result of subtraction ($t_0+t_1-t_7=x_7$).

(5) At the clock cycle 4, it uses the pair comprising the fifth stage adder 11e' and subtractor 12e' to perform the addition and subtraction of the inputs ($t_0-t_1+t_2$) and $t_6$, the adder 11e' outputs the result of addition ($t_0-t_1+t_2+t_6=x_1$), and the subtractor 12e' outputs the result of subtraction ($t_0-t_1+t_2-t_6=x_6$).

(6) At the clock cycle 5, it uses the pair comprising the seventh stage adder 11g' and subtractor 12g' to perform the addition and subtraction of the inputs ($t_0+t_1-t_3$) and $t_4$, the adder 11g outputs the result of addition ($t_0+t_1-t_3+t_4=x_3$), and the subtractor 12g outputs the result of subtraction ($t_0+t_1-t_3-t_4=x_4$).

(7) At the clock cycle 6, it uses the pair comprising the sixth stage adder 11f' and subtractor 12f' to perform the addition and subtraction of the inputs ($t_0-t_1-t_2$) and $t_5$, the adder 11f' outputs the result of addition ($t_0-t_1-t_2+t_5=x_2$), and the subtractor 12f' outputs the result of subtraction ($t_0-t_1-t_2-t_5=x_5$).

In this way, the eight elements ($s_0$ to $s_7$) of the original data [X] are output to the output register 65 during seven clock cycles.

If the speed of calculation of the adder 11 and the subtractor 12 of the addition and subtraction circuit 64 is slow and the addition and subtraction is not finished in one clock cycle, the additional and subtraction circuit 64 may include a plurality of unit circuits each comprising a pair of the adder 11 and the subtractor 12) for making the calculation time fall within an allowable time (eight clock cycles) for operation without disturbance of the pipeline, in the same way as the case of the addition and subtraction circuit 2 of the 8×8 DCT system.

In this way, in the 8×8 IDCT system of the present invention, the vector [X] comprised of the eight elements of the columns of the original data [X] at the time of calculation of the 8×8 IDCT is calculated by the two processings of the above-mentioned step 1 and step 2 on the vector [C] comprised of the eight elements of the columns of the data [C] in the frequency domain. This calculation is performed for each of the eight columns of [C], so that the original data [X] comprised of 64 elements is calculated.

The number of multiplications required at the time of obtaining the eight elements of the columns of the vector [X] is just the 22 operations performed at step 1, so the number of multiplications required when obtaining the frequency domain data [C] (64 elements) becomes 22×8 columns=176.

In this way, in the 8×8 IDCT system of the present invention, it is possible to reduce the number of multiplication 80 times compared with the conventional 8×8 IDCT system. Also, when the multiplication and additions are completed in one clock cycle, the multiplication and addition circuits used may be the three multiplication and addition circuits 20, 21, and 22, and therefore the circuit structure can be simplified. Further, the number of the operations involving irrational numbers is reduction in, so it is possible to reduce the accumulation of the error caused during the approximation of the irrational numbers.

In the above-mentioned embodiments, illustration was made of an 8×8 DCT system for performing an 8×8 DCT transform and an 8×8 IDCT system for performing an 8×8 IDCT transform, but applications of the present invention are not limited to systems for performing an 8×8 DCT and 8×8 IDCT and for example may also be circuits for performing 4×4 DCT and 4×4 IDCT or 4×8 DCT and 4×8 IDCT.

Also, in the above-mentioned embodiments, it is possible to make a matrix factrization of the equations of the 8×8 discrete cosine transformation and the 8×8 inverse discrete cosine transformation into constant matrices and a matrix including a small number of irrational numbers, and realize the operations in accordance with the factorized matrices by an electronic circuit formed by semiconductor device or, alternatively, to assemble programs in accordance with the above-mentioned calculation method and execute the program by computer software using a computer and then perform the above-mentioned operations by DSP etc. In this way, it is possible to use any method for realization of the above-mentioned 8×8 discrete cosine transformation system and 8×8 inverse discrete cosine transformation system, as well as other DCT systems and other IDCT systems.

According to the DCT system of the present invention, for example, in the 8×8 DCT system, the matrix of the discrete cosine transformation is factorized into a constant matrix [Q] having factors of 1, 0, and −1 and a matrix [R] with less irrational numbers than the discrete cosine transformation matrix, addition and subtraction corresponding to the inner product computation of the data of the matrix form with the constant matrix [Q] are performed using the addition and subtraction circuit, and multiplication and additions corresponding to the inner product computation of the result of computation of the addition and subtraction circuit with the matrix [R] are performed using the multiplication and addition circuit, so the multiplication in the multiplication and addition circuit can be performed with fewer multiplications compared with the case of the multiplication of the data of a matrix form with the standard discrete cosine transformation matrix.

Therefore, it is possible to reduce the number of operations including irrational numbers and to improve the accuracy of the results of calculation. Further, it is possible to reduce the number of multipliers, the circuit structure becomes simpler, and the size of the circuit can be reduction in. Further, since the number of operations involving irrational numbers is reduction in, it is possible to reduce the accumulation of error caused when approximating irrational numbers. Further, it is possible to improve the operation speed.

Further, according to the 8×8 IDCT system of the present invention, the matrix of the inverse discrete cosine transformation is factorized into a transposition matrix [R'] with less irrational numbers than the discrete cosine transformation matrix and a constant transposition matrix [Q'] having factors of 1, 0, and −1, multiplication and addition corresponding to the inner product computation of the results of the computation of the addition and subtraction circuit with the matrix [R'] is performed using the multiplication and addition circuit, and addition and subtraction corresponding to the inner product computation of the data of a matrix form with the constant transposition matrix [Q'] is performed using the addition and subtraction circuit, so the multiplication in the multiplication and addition circuit can be performed with fewer multiplications compared with the case of the multiplication of the data of a matrix form with the standard inverse discrete cosine transformation matrix.

Therefore, it is possible to reduce the number of operations including irrational numbers and to improve the accuracy of the results of calculation. Further, it is possible to reduce the number of multipliers, the circuit. structure becomes simpler, and the size of the circuit can be reduction in. Further, since the number of operations involving irrational numbers is reduction in, it is possible to reduce the accumulation of error caused when approximating irrational numbers. Further, it is possible to improve the operation speed.

Many widely different embodiments of the present invention may be constructed without departing from the spirit and scope of the present invention, and it should be understood that the present invention is not restricted to the specific embodiments described above.

What is claim is:

1. A discrete cosine transformation system, for performing a matrix computation successively on at least one constant matrix having factors of +1, −1, and 0, a matrix including irrational numbers defined by the discrete cosine transformation, and a matrix of input data, said system comprising:
- at least one addition and subtraction means for performing addition and subtraction resulting in an inner product of said constant matrix and said matrix of input data;
- a multiplication and addition means for performing multiplication and addition resulting in an inner product of said matrix including irrational numbers and said inner product of said constant matrix and said matrix of input data; and
- means for communicating said inner product of said constant matrix and said matrix of input data from said at least one addition and subtraction means to said multiplication and addition means.

2. A system as claimed in claim 1 wherein said matrix of input data is a column vector having eight components.

3. A system as claimed in claim 1 wherein said at least one constant matrix is a matrix of eight columns and eight rows.

4. A system as claimed in claim 3 wherein said constant matrix is the matrix:

| 1 | 1 | 1 | 1 | 1 | 1 | 1 | 1 |
|---|---|---|---|---|---|---|---|
| 1 | −1 | −1 | 1 | 1 | −1 | −1 | 1 |
| 0 | 1 | −1 | 0 | 0 | −1 | 1 | 0 |
| 1 | 0 | 0 | −1 | −1 | 0 | 0 | 1 |
| 0 | 0 | 0 | 1 | −1 | 0 | 0 | 0 |
| 0 | 0 | 0 | 0 | −1 | 0 | 0 | 0 |
| 0 | 1 | 0 | 0 | 0 | 0 | −1 | 0 |
| 1 | 0 | 0 | 0 | 0 | 0 | 0 | −1. |

5. A system as claimed in claim 1 wherein said matrix including irrational numbers is the matrix:

| A | 0 | 0 | 0 | 0 | 0 | 0 | 0 |
|---|---|---|---|---|---|---|---|
| 0 | 0 | 0 | 0 | G | F | E | D |
| 0 | 0 | C | B | 0 | 0 | 0 | 0 |
| 0 | 0 | 0 | 0 | −F | −D | −G | E |
| 0 | A | 0 | 0 | 0 | 0 | 0 | 0 |
| 0 | 0 | 0 | 0 | E | G | −D | F |
| 0 | 0 | −B | C | 0 | 0 | 0 | 0 |
| 0 | 0 | 0 | 0 | −D | E | −F | G, | wherein,
A=cos (π/4),
B=cos (π/8),
C=cos (3π/8),
D=cos (π/16),
E=cos (3π/16),
F=cos (5π/16) and
G=cos (7π/16).

6. An inverse discrete cosine transformation system for performing a matrix computation successively on a matrix including irrational numbers defined by an inverse discrete cosine transformation, at least one constant matrix comprised of factors of +1, −1, and 0, and a matrix of input data, said system comprising:
- a multiplication and addition means for performing multiplication and addition resulting in an the inner product of said matrix including irrational numbers and said matrix of input data:
- at least one addition and subtraction means for performing addition and subtraction resulting in an inner product of said constant matrix and said inner product of said matrix including irrational numbers and said matrix of input data; and
- means for communicating said inner product of said matrix including irrational numbers and said matrix of input data from said multiplication and addition means to said at least one addition and subtraction means.

7. A system as claimed in claim 6 wherein said matrix of input data is a column vector having eight components.

8. A system as claimed in claim 6 wherein said at least one constant matrix is a matrix of eight columns and eight rows.

9. A system as claimed in claim 8 wherein said constant matrix is the matrix

| 1 | 1 | 0 | 1 | 0 | 0 | 0 | 1 |
|---|---|---|---|---|---|---|---|
| 1 | −1 | 1 | 0 | 0 | 0 | 1 | 0 |
| 1 | −1 | −1 | 0 | 0 | 1 | 0 | 0 |
| 1 | 1 | 0 | −1 | 1 | 0 | 0 | 0 |
| 1 | 1 | 0 | −1 | −1 | 0 | 0 | 0 |
| 1 | −1 | −1 | 0 | 0 | −1 | 0 | 0 |
| 1 | −1 | 1 | 0 | 0 | 0 | −1 | 0 |
| 1 | 1 | 0 | 1 | 0 | 0 | 0 | −1. |

10. A system as claimed in claim 6 wherein said matrix including irrational numbers is the matrix:

$$\begin{pmatrix} A & 0 & 0 & 0 & 0 & 0 & 0 & 0 \\ 0 & 0 & 0 & 0 & A & 0 & 0 & 0 \\ 0 & 0 & C & 0 & 0 & 0 & -B & 0 \\ 0 & 0 & B & 0 & 0 & 0 & C & 0 \\ 0 & G & 0 & -F & 0 & E & 0 & -D \\ 0 & F & 0 & -D & 0 & G & 0 & E \\ 0 & E & 0 & -G & 0 & -D & 0 & -F \\ 0 & D & 0 & E & 0 & F & 0 & G \end{pmatrix},$$

wherein,

A=cos (π/4),

B=cos (π/8),

C=cos (3π/8),

D=cos (π/16),

E=cos (3π/16),

F=cos (5π/16) and

G=cos (7π/16).

* * * * *